United States Patent
Morales De La Rica et al.

(10) Patent No.: US 8,285,425 B2
(45) Date of Patent: Oct. 9, 2012

(54) SYSTEM AND METHOD FOR CONTROLLING AN UNARMED AIR VEHICLE

(75) Inventors: Maria Jesús Morales De La Rica, Madris (ES); Sergio De La Parra Carque, Torrejón de Ardoz (ES); Francisco Javier Angel Martínez, Madrid (ES); Francisco José Ibañez Colás, Madrid (ES); Andrés Herrera Martín, Madrid (ES)

(73) Assignee: Instituto Nacional de Tecnica Aeroespacial "Esteban Terradas", Madrid (ES)

( * ) Notice: Subject to any disclaimer, the term of this patent is extended or adjusted under 35 U.S.C. 154(b) by 1221 days.

(21) Appl. No.: 11/629,148

(22) PCT Filed: Jun. 6, 2005

(86) PCT No.: PCT/ES2005/000319
§ 371 (c)(1),
(2), (4) Date: Jan. 10, 2008

(87) PCT Pub. No.: WO2005/121916
PCT Pub. Date: Dec. 22, 2005

(65) Prior Publication Data
US 2008/0243317 A1    Oct. 2, 2008

(30) Foreign Application Priority Data
Jun. 8, 2004   (ES) .................................. 200401387

(51) Int. Cl.
*G05D 1/00*  (2006.01)
*G01C 23/00* (2006.01)
*G06F 17/00* (2006.01)

(52) U.S. Cl. ....... 701/3; 701/1; 701/2; 701/11; 701/120; 701/528; 244/3.16; 244/152

(58) Field of Classification Search .............. 702/57; 244/3.16, 152; 701/87, 2, 1, 23, 214, 213
See application file for complete search history.

(56) References Cited

U.S. PATENT DOCUMENTS
3,680,566 A    8/1972   Tanaka et al. ................ 133/3
(Continued)

FOREIGN PATENT DOCUMENTS
DE    101 06 502 A1    8/2002
(Continued)

OTHER PUBLICATIONS
International Search Report dated Oct. 3, 2005 from PCT/ES2005/000319.
(Continued)

*Primary Examiner* — Khoi Tran
*Assistant Examiner* — Bhavesh V Amin
(74) *Attorney, Agent, or Firm* — Ohlandt, Greeley, Ruggiero & Perle, LLP (57) ABSTRACT

The invention relates to an unmanned air vehicle control system and method, designed such that, in one mission mode, the vehicle follows the mission route. The system comprises means (400, 450) for storing data indicating at least one auxiliary route (4000, 4001, 4002, 4003), such that each of a plurality of the mission route segments (10, 20), is assigned at least part (30, 31, 32, 33) of at least one auxiliary route. Furthermore, the system comprises route change means (53) designed for, as a response to a mission abandonment event (52), determining which part of which auxiliary route is assigned to the mission route segment where the vehicle is located, such that the vehicle can change the mission route to the corresponding auxiliary route.

17 Claims, 5 Drawing Sheets

U.S. PATENT DOCUMENTS

| | | | |
|---|---|---|---|
| 6,122,572 A * | 9/2000 | Yavnai | 701/23 |
| 6,377,875 B1 * | 4/2002 | Schwaerzler | 701/2 |
| 6,498,968 B1 * | 12/2002 | Bush | 701/3 |
| 6,643,580 B1 * | 11/2003 | Naimer et al. | 701/206 |
| 6,687,606 B1 * | 2/2004 | Moitra et al. | 701/202 |
| 6,725,152 B2 * | 4/2004 | Moitra et al. | 701/202 |
| 6,792,363 B1 * | 9/2004 | Bye | 702/57 |
| 6,813,559 B1 * | 11/2004 | Bodin et al. | 701/206 |
| 6,856,894 B1 * | 2/2005 | Bodin et al. | 701/206 |
| 6,859,729 B2 * | 2/2005 | Breakfield et al. | 701/216 |
| 6,985,810 B2 * | 1/2006 | Moitra et al. | 701/202 |
| 7,107,148 B1 * | 9/2006 | Bodin et al. | 701/206 |
| 7,130,741 B2 * | 10/2006 | Bodin et al. | 701/206 |

FOREIGN PATENT DOCUMENTS

| | | |
|---|---|---|
| EP | 1 462 898 A2 | 9/2004 |
| GB | 2198274 | 6/1988 |
| WO | WO 95/19547 | 7/1995 |
| WO | WO 99/06969 | 2/1999 |

OTHER PUBLICATIONS

International Search Report dated Feb. 12, 2007 from corresponding European Patent Application 06380265.

* cited by examiner

SYSTEM AND METHOD FOR CONTROLLING AN UNARMED AIR VEHICLE

FIELD OF THE INVENTION

The invention is comprised within the field of aircrafts or unmanned air vehicles (UAV).

BACKGROUND OF THE INVENTION

Unmanned air vehicles, i.e. vehicles that do not have a physical pilot on board, can be of great interest not just for military missions but also for civil missions. Furthermore, the emergence of new data and image uptake and interpretation systems makes the number of tasks that can be carried out by this type of vehicles increase more and more in both the civil and the military or police scope.

A fundamental difference between unmanned air vehicles and manned air vehicles is that in the case of the former, in addition to the aerial system, a ground system and data link means necessary for operating the vehicle are also required. Nevertheless, there may be moments or periods which are shorter or longer in time (in some cases, corresponding to most of the duration of the flight) during which the vehicle must function autonomously. Given that during the flight or "mission" in an unmanned air vehicle it is quite probable that unexpected events or conditions (for example changes in weather conditions, wind, turbulences, mechanical problems, etc.) may occur, autonomous control of the flight becomes a complex task.

Figure 1:
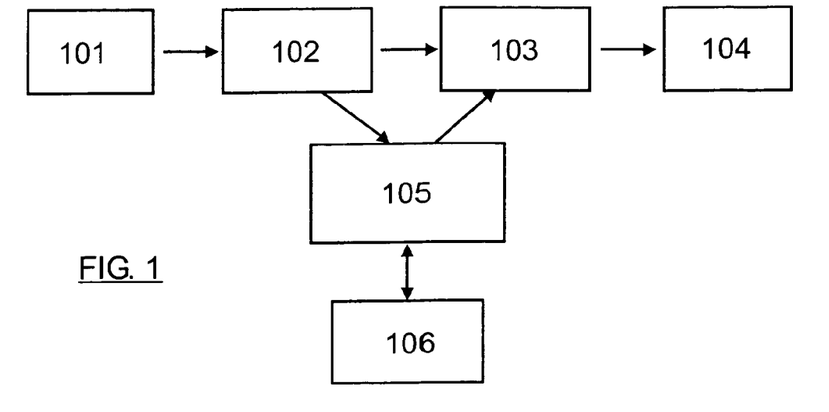
FIG. 1 shows a block diagram representing the main modules of an unmanned vehicle control system (according to the state of the art but also applicable to the invention).

There are a large number of unmanned vehicle control systems. They are usually based on different modules responsible for different parts of the control. For example, the following general modules schematically shown in FIG. 1 may exist:

- sensors 101 acquiring and transmitting data related, for example, to the state of the actuators 104, the state of the aircraft (for example, its position, altitude or orientation) and the meteorological conditions (mainly wind intensity and direction);
- actuators 104 providing the position of the mechanical control elements which, in the case of an aircraft, provide the forces necessary for controlling the flight;
- an estimation and navigation module 102 responsible for obtaining the state variables needed for controlling the system from the values provided by the measurement variables of the sensors;
- a guidance and control module 103 providing the actuators 104 with the control variables needed for stabilizing and taking the system state variables to the desired reference values in each case; and
- a mission management module 105 which, based on the available data regarding the information on the state of the aircraft it receives from the estimation and navigation module 102 and when the vehicle is flying under the control of an external operator 106, such as a ground control station, based on the instructions it receives from said external operator, provides the guidance and control module with the desired reference variables so as to fulfill certain objectives; this module normally includes means for storing data indicating a mission route comprising a plurality of mission route segments (defined, for example, by "waypoints" corresponding to the mission route).

There are a large number of publications reflecting different aspects of unmanned air vehicle control.

For example, patent document U.S. Pat. No. 6,122,572 describes an unmanned air vehicle control system designed for the execution of a mission and having a programmable decision unit capable of managing and controlling the execution of the mission taking into account all available systems and data in the vehicle.

Patent document U.S. Pat. No. 6,349,258 relates to a method for generating, from two waypoints, a course which must necessarily pass between these two points.

Programmed unmanned air vehicles are known to fly according to a "mission route" (which can be preprogrammed) and with the capacity to calculate alternative routes in the case of incidents. For example, patent document U.S. Pat. No. 6,377,875s describes an unmanned air vehicle control system in which a safe flight route is programmed. The vehicle can be controlled remotely via radio; if communication with the control station is lost, the on-board system recalculates the route without the intervention of the control station.

However, the recalculation of the route on board the vehicle requires that the vehicle has an on-board system with sufficient capacity to recalculate the route. This may involve, for example:

- the need to have fairly detailed data on the terrain (a digital terrain model);
- a complex computer system with the capacity to completely recalculate the route;
- a certain risk of "unpredictability" of the route which is finally chosen by the vehicle (which may involve risks and problems for aviation and/or air control in the area, for high buildings in the area, etc.);
- uncertainty regarding where recovery of the vehicle will occur;
- uncertainty regarding the needs of the vehicle with respect to fuel (given that in the moment of vehicle take-off, its course in the event that it has to divert from its mission route cannot be foreseen).

An objective of the invention is to provide an alternative system for implementing alternative or auxiliary routes apart from the mission route which may involve improvements in some or in all of the aforementioned aspects.

SUMMARY OF THE INVENTION

A first aspect of the invention relates to an unmanned air vehicle control system, comprising, like virtually all conventional unmanned flight systems with certain autonomous control capacity:

flight control means designed for providing control signals to control components (sometimes called actuators) of the vehicle such that the vehicle follows an active route according to data indicating said active route stored in the control system (on board the vehicle);

means for storing data indicating a mission route comprising a plurality of mission route segments;

the system being designed such that, in one mission mode, the mission route is the active route, such that the control means provide the control signals calculated from (inter alia) the data indicating the mission route, so that the vehicle follows the mission route.

According to the invention, the system further comprises means for storing data indicating at least one auxiliary route different from the mission route, such that each of a plurality of the mission route segments is assigned at least part of at least one auxiliary route;

flight mode determination means designed for determining if the flight should continue in the mission mode or if it should abandon the mission mode (for example, due to the fact that an incident, such as unexpected environmental conditions, shortage of fuel for completing the mission, etc., is detected), and for generating a mission mode abandonment event if the means determine that the mission mode should be abandoned;

route change means associated to the flight mode determination means and designed for, as a response to a mission abandonment event,
- determining which part of which auxiliary route is assigned to the mission route segment where the vehicle is located;
- calculating a transition route to said part of the auxiliary route;
- defining the transition route as the active route, such that the flight control means provide control signals so that the vehicle follows said transition route to the corresponding part of the auxiliary route;
- once the transition route is completed, defining the corresponding auxiliary route as the active route, such that the flight control means provide control signals so that the vehicle follows said auxiliary route.

It is therefore not necessary to carry out in each case a complete route recalculation; at all times (or at least when the vehicle is located in certain mission route segments), there is (at least) part of the auxiliary route (known previously by the system operator, given that the mission route segments—part of the auxiliary route relationship can be established on the ground) associated to the segment, and the system determines which part it is (by consulting, for example, a table reflecting this mission route segments—part of the auxiliary route relationship). Therefore, the system only has to calculate the transition route to said part of the auxiliary route, and not a complete auxiliary route. This reduces the amount of information and the route calculation capacity that the vehicle must have, and it further reduces the operator's uncertainty as regards what will happen with the vehicle if certain incidents occur during the mission route. This logically aids in calculating the amount of fuel the aircraft requires so that it can "always" reach a "safe" recovery area, and it reduces the risk of dangerous air traffic interferences in the area, etc. Furthermore, it is a system that is easy to implement given that a great deal of the data (for example, the parts of the auxiliary routes associated to each segment, etc.) can be calculated in powerful computers on the ground and then be loaded into the on-board computer (which is less powerful given that it will be a dedicated computer having the weight and size limitations characteristic of an on-board aeronautic system), which will then only have to calculate transition routes (brief and without needing a great deal of data on the terrain) and carry out the other steps inherent to this type of systems.

Each auxiliary route can be determined by a plurality of auxiliary route waypoints, and each part of the auxiliary route may correspond to one of said auxiliary route waypoints. In other words, the auxiliary routes could be determined from waypoints.

The mission route can be determined by a plurality of mission route waypoints, and each mission route segment may correspond to one of said mission route waypoints. In other words, in this case, the mission route would also be defined from waypoints.

The system may comprise means for storing data indicating a plurality of auxiliary routes, such that each of a plurality of the mission route segments is assigned at least part of one of said auxiliary routes. This involves, for example, great flexibility in the design of the mission route and its corresponding auxiliary routes.

The means for storing data indicating a mission route and the means for storing data indicating at least one auxiliary route can be designed as:
- a list of the mission route segments;
- for each auxiliary route, a list of the parts of the auxiliary route;
- associated to the list of mission route segments, for each of a plurality of the segments of said list,
  - at least one auxiliary route indicator specifying for said segment an auxiliary route, and
  - at least one indicator of part of the auxiliary route specifying for said segment the part of said auxiliary route associated to the segment.

This way of relating routes can be easily implemented in an electronic control system by means of the corresponding tables stored in the memory of the system.

The flight mode determination means can be designed for generating mission mode abandonment events such that they include an event type indicator selected from a plurality of event types according to the conditions that have caused the abandonment of the mission mode; and the route change means can be designed for, as a response to a mission abandonment event, determining which part of the auxiliary route is assigned to the mission route segment where the vehicle is located according to the event type indicator.

This allows programming the control system such that in a defined segment, the vehicle has the option of choosing from several auxiliary routes, such choice being carried out based on the event type indicator. Alternative auxiliary routes can thus be established and the aircraft can be programmed such that it chooses the route according to "what has happened", such that the auxiliary route which best suits the circumstances (for example, in the case of a critical shortage of fuel, the shortest auxiliary route, etc.) is always used. To that end, at least one of the auxiliary route indicators and at least one of the indicators of part of the auxiliary route can be designed for indicating the auxiliary route and the part of said auxiliary route according to the event type indicator.

The route change means can be designed for calculating a transition route such that:
if the movement to the part of the auxiliary route involves a climb to a height exceeding the current height of the vehicle and a movement in the horizontal direction, the transition route is calculated such that it starts with a climb substantially up to said greater height, followed by the movement in the horizontal direction; and
if the movement to the part of the auxiliary route involves a descent to a height less than the current height of the vehicle and a movement in the horizontal direction, the transition route is calculated such that it starts with the movement in the horizontal direction, followed by a descent to said lower height.

The risk of the vehicle interfering with (crashing against) "unexpected" elements (mountains, buildings, etc.) during the transition route is thus reduced, and the need to have exact data on board regarding the terrain so as to prevent this type of "obstacles" during the transition route is reduced.

Each mission segment can be associated with another mission route segment corresponding to a return mode, and the system can be designed such that as a response to a return command, the vehicle heads for said associated mission route segment, corresponding to the return mode, to then follow the mission route in a return direction (for example, such that the vehicle, as a response to the command, heads for said associated mission route segment and once it is reached, it heads for its corresponding associated mission route segment, and so on and so forth).

Another aspect of the invention relates to an unmanned air vehicle, including a control system according to what has been described above.

Another aspect of the invention relates to an unmanned air vehicle control method, comprising the steps of:

providing control signals to vehicle control components such that the vehicle follows an active route according to data indicating said active route stored in a vehicle control system;

in one mission mode, defining the mission route as the active route, such that the control means provide the control signals calculated from data indicating the mission route, so that the vehicle follows the mission route, the mission route comprising a plurality of mission route segments;

having data indicating at least one auxiliary route different from the mission route, such that each of a plurality of the mission route segments is assigned at least part of at least one auxiliary route;

determining if the flight should continue in the mission mode or if it should abandon the mission mode, and generating a mission mode abandonment event if it is determined that the mission mode should be abandoned;

as a response to a mission abandonment event,
determining which part of which auxiliary route is assigned to the mission route segment where the vehicle is located;
calculating a transition route to said part of the auxiliary route;
providing control signals so that the vehicle follows said transition route to the corresponding part of the auxiliary route;
once the transition route is completed, providing control signals so that the vehicle follows said auxiliary route.

Each auxiliary route can be determined by a plurality of auxiliary route waypoints, and each part of the auxiliary route may correspond to one of said auxiliary route waypoints. The mission route can be determined by a plurality of mission route waypoints, and each mission route segment may correspond to one of said mission route waypoints.

Data indicating a plurality of auxiliary routes may be available, such that each of a plurality of the mission route segments is assigned at least part of one of said auxiliary routes.

The data indicating a mission route and the data indicating at least one auxiliary route can be stored in a configuration comprising:

a list of the mission route segments;
for each auxiliary route, a list of the parts of the auxiliary route;
associated to the list of mission route segments, for each segment of said list (or at least for each of a plurality of the segments of said list),
at least one auxiliary route indicator specifying for said segment an auxiliary route, and
at least one indicator of part of the auxiliary route specifying for said segment the part of said auxiliary route associated to the segment.

The mission mode abandonment events can be generated such that they include an event type indicator selected from a plurality of event types according to conditions which have caused the abandonment of the mission mode, such that it can be determined which part of the auxiliary route is assigned to the mission route segment where the vehicle is located according to the event type indicator.

At least one of the auxiliary route indicators and at least one of the indicators of part of the auxiliary route can indicate the auxiliary route and the part of said auxiliary route, respectively, according to the event type indicator.

The transition route can be calculated such that:
if the movement to the part of the auxiliary route involves a climb to a height exceeding the current height of the vehicle and a movement in the horizontal direction, the transition route is calculated such that it starts with a climb substantially up to said greater height, followed by the movement in the horizontal direction; and
if the movement to the part of the auxiliary route involves a descent to a height less than the current height of the vehicle and a movement in the horizontal direction, the transition route is calculated such that it starts with the movement in the horizontal direction, followed by a descent to said lower height.

Each mission route segment can be associated with another mission route segment corresponding to a return mode, such that as a response to a return command, the vehicle heads for said associated mission route segment, corresponding to the return mode, to then follow the mission route in a return direction.

BRIEF DESCRIPTION OF THE DRAWINGS

A series of drawings will be very briefly described below which aid in better understanding the invention and some of such drawings are expressly related to an embodiment of said invention, presented as an illustrative and non-limiting example thereof.

DETAILED DESCRIPTION OF THE INVENTION

According to a preferred embodiment of the invention, the unmanned air vehicle management system handles mission components, provided a priori by a mission plan, contemplating at all times the possibility of diverting from the route defining the mission (mission route) to other auxiliary routes, according to the point of the mission where the vehicle is located and the cause for the diversion from the expected plan.

To that end, the mission route is defined by an ordered set of waypoints forming a nominal route which will be useful as a reference to the vehicle for carrying out the mission under normal conditions and one or several ordered sets of waypoints determining auxiliary routes.

The definition of routes by means of waypoints is conventional in the field of unmanned air vehicles and in the field of manned air vehicles with an automatic pilot (there are also other ways of defining the routes, for example, with the use of several parameterized courses, and the invention is also applicable to this type of systems; however, in order to facilitate understanding, the preferred embodiment of the invention will be described in reference to a waypoint based system). The waypoint is usually a fixed point in space which is useful for guiding the unmanned air vehicle (or manned air vehicle in automatic pilot flight mode). Each waypoint can include associated information which is used by the control system to determine the way in which it should reach the waypoint. An ordered sequence of waypoints forms a plurality of legs or sections of the route, defining a reference course for the vehicle; this reference course being what is usually referred to as the "route".

Figure 2:
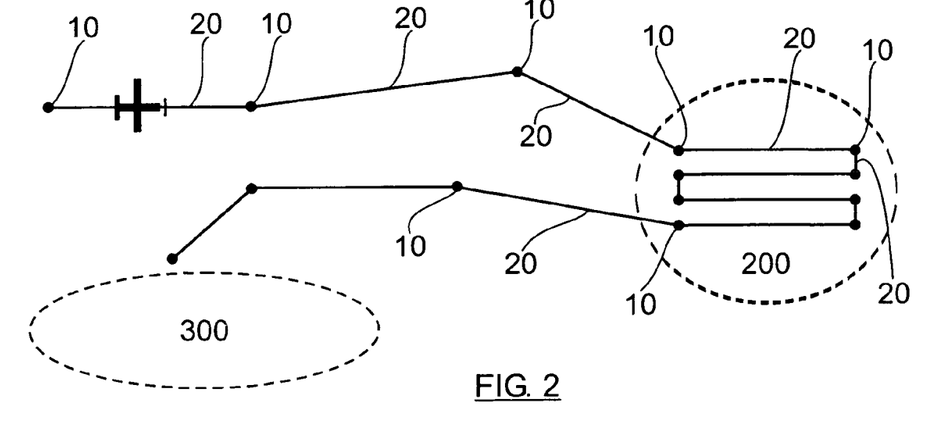
FIG. 2 schematically shows a route defined by waypoints according to the state of the art.

FIG. 2 schematically shows a route defined by waypoints 10 forming the legs 20 of a mission route or nominal route, according to the state of the art; the mission route will take the vehicle to a mission area 200 and then back to a nominal recovery area 300.

The waypoint towards which the vehicle is headed at all times is usually called the "current waypoint". Logically in practice, vehicles do not fly exactly from one point to another, but rather there is usually a "distance to waypoint"; when the vehicle reaches the "distance to waypoint" of the "current waypoint", this "current waypoint" is considered "reached", and a maneuver is initiated so that the vehicle heads for the next "waypoint", which becomes the "current waypoint"; this transition usually corresponds to a turn corresponding to an arc of circumference tangent to the legs ending at the original "current waypoint" and at the new "current waypoint", respectively. The distance to waypoint, which can be previously established for each waypoint, must therefore be fixed taking into account the angle that two consecutive segments form and the radius of the arc of circumference which is desired to be used for the transition (depending, inter alia, on the vehicle turning capacity). Defining the distance to waypoint and the transition course with purely geometric determinants allows knowing, a priori, the entire course that a vehicle should follow when it follows the route (unless unexpected incidents occur). Given that this way of defining routes is conventional, it is not necessary to describe it in more detail.

Figure 5:
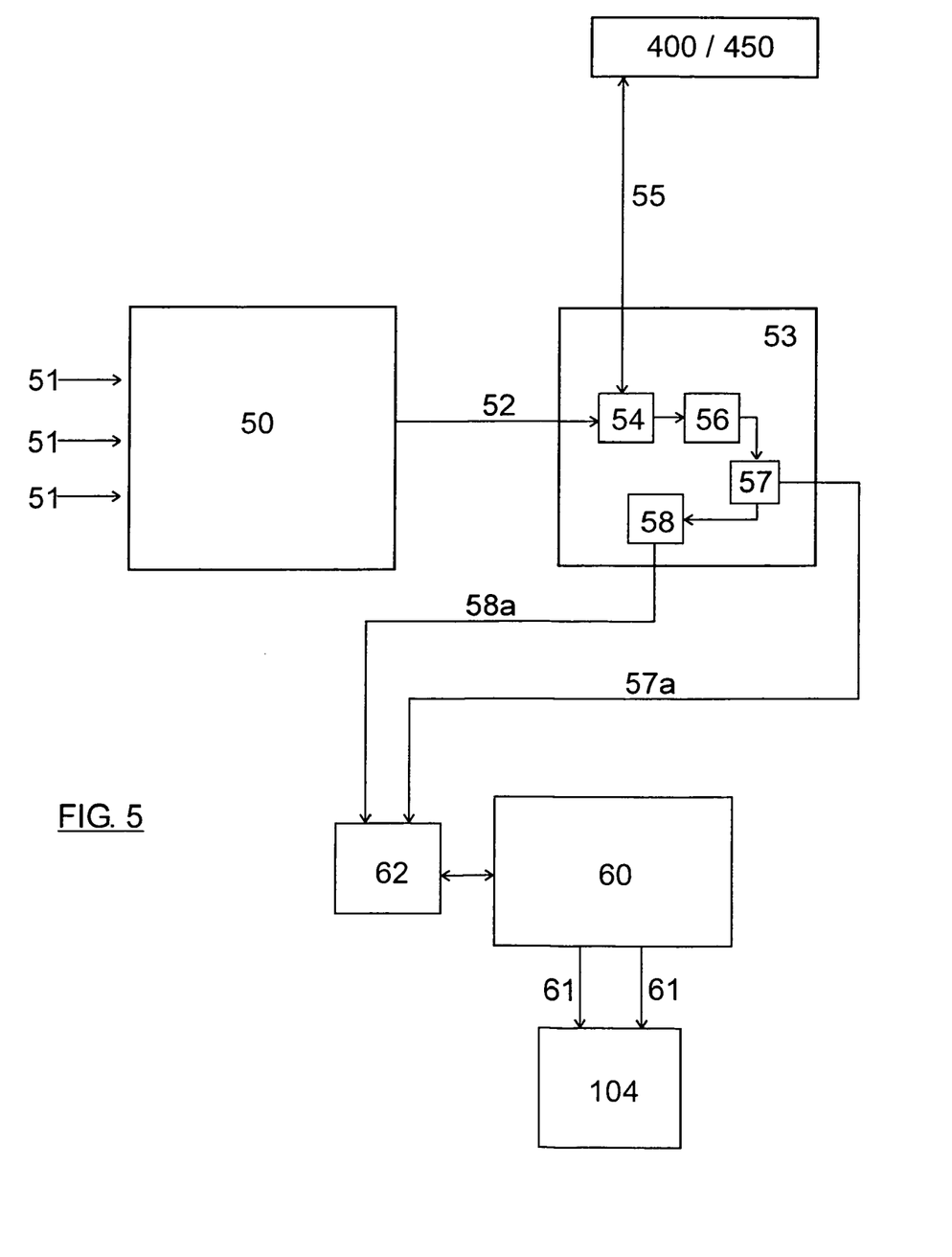
FIG. 5 shows a block diagram schematically representing parts of the system of the invention, including the flight mode determination means and the route change means.

As described above, the system of the invention comprises (as is schematically shown in FIG. 5):

flight control means 60 designed for providing control signals 61 to control components (actuators 104) of the vehicle such that the vehicle follows an active route according to data indicating said active route stored in a memory 62 of the control system;

means 400 for storing data indicating a mission route comprising a plurality of mission route segments (each of which may correspond, for example, to the part of the course of the vehicle during which a defined waypoint 10 is the "current waypoint");

the system being designed such that, in one mission mode, the mission route is the active route, such that the control means 60 provide the control signals calculated from the data indicating the mission route, so that the vehicle follows the mission route.

This is all conventional in, for example, waypoint-based control systems.

Figure 3:
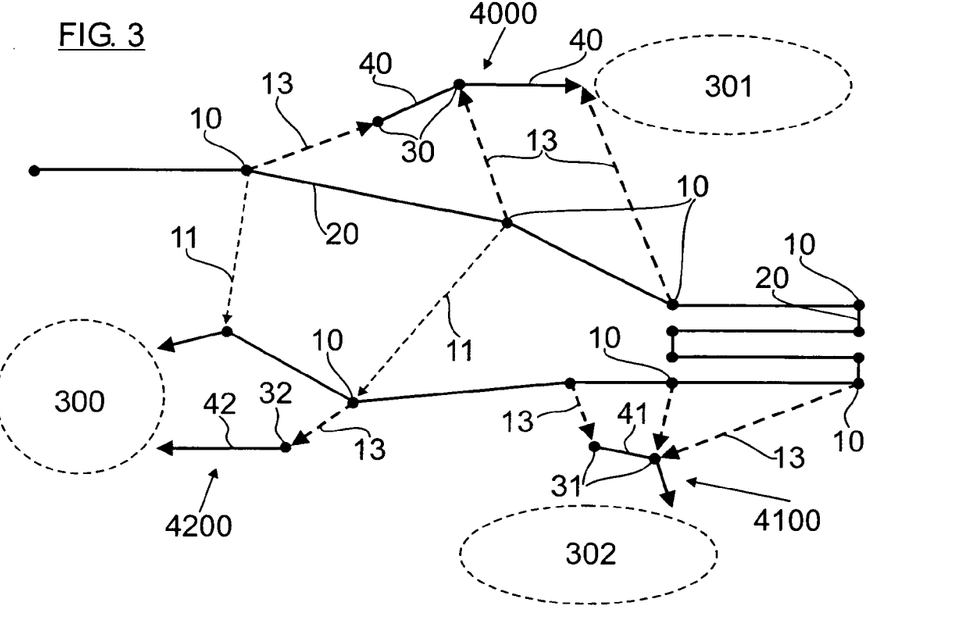
FIG. 3 shows a mission route and several auxiliary routes according to a preferred embodiment of the invention.

However, according to the invention, the system further comprises means for storing data indicating at least one auxiliary route different from the mission route, such that each of a plurality of the mission route segments is assigned at least part of at least one auxiliary route. FIG. 3 shows how a plurality of the waypoints 10 of the mission route are associated (13) to defined waypoints 30, 31, 32 of different auxiliary routes 4000, 4100, 4200 (formed by auxiliary route legs 40, 41 and 42, respectively), established for taking the aircraft to emergency recovery areas 301, 302 or to the nominal recovery area 300. (FIG. 3 further schematically shows for two of the mission route waypoints, how said mission route waypoints are associated (11) to another mission route waypoint corresponding to a return mode, the system being designed such that as a response to a return command, the vehicle heads for said associated mission route segment, corresponding to the return mode, to then follow the mission route in a return direction).

Figure 4:
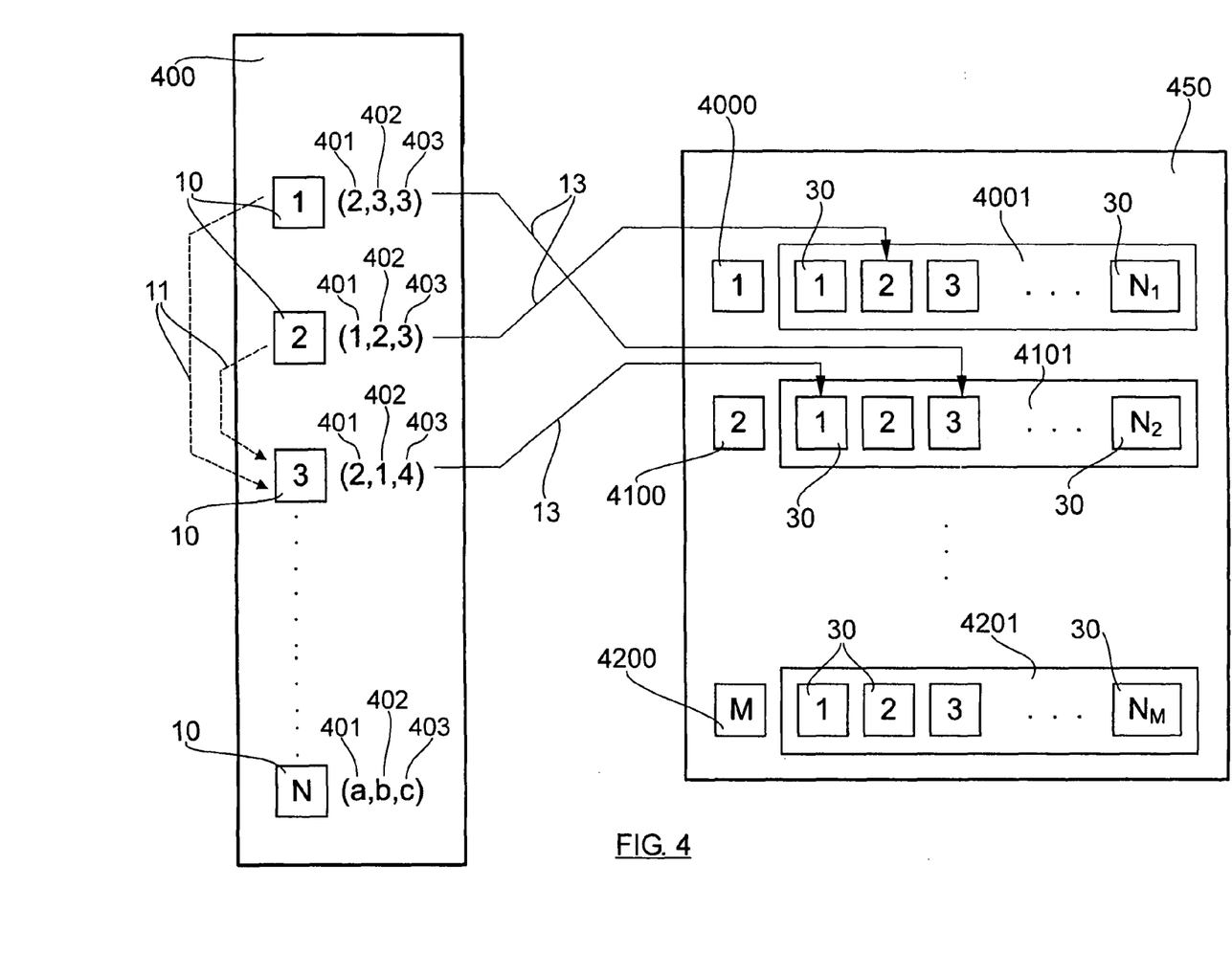
FIG. 4 schematically shows a possible implementation of the relationship between mission route segments and parts of the auxiliary route.

FIG. 4 shows how the means for storing data indicating a mission route and the means for storing data indicating at least one auxiliary route can be implemented, namely:

a list 400 of the mission route segments, in this case, of the N waypoints 10 of the mission route (numbered 1, 2, 3, ..., N) (this list can include all the relevant data for the definition of each waypoint, for example, their coordinates, etc.);

for each auxiliary route (4000, 4100, 4200) (out of a total of M auxiliary routes, in the case of FIG. 3, out of 3 auxiliary routes), a list (4001, 4101, 4201) of the parts of the auxiliary route (in this case, of the $N_1$, $N_2$, $N_M$ waypoints 30 of the auxiliary routes);

associated to the list 400 of segments (points 10) of the mission route for each segment (point 10) of said list, at least one auxiliary route indicator 401 specifying for said segment an auxiliary route (in the case of segment N, auxiliary route "a", etc.), and at least one indicator 402 of part of the auxiliary route specifying for said segment the part (in the case of segment N, waypoint "b" of auxiliary route "a") of said auxiliary route associated to the segment.

This data can be stored in a list 450 of auxiliary routes, in part of a corresponding memory.

The list 400 further includes, in an associated manner, each waypoint 10 of the mission route, another waypoint 10 of the mission route corresponding to a return mode; this other waypoint 10 is indicated with an indicator 403 ("c" in the case of the segment or waypoint "N" in the list 400); the system is designed such that as a response to a return command, the vehicle heads for said associated mission route waypoint, corresponding to the return mode, to then follow the mission route in a return direction (for example, such that the vehicle, as a response to the command, heads for said associated mission route waypoint and once it is reached, it heads for its corresponding associated mission route waypoint, and so on and so forth).

The "jumps" 13 from certain waypoints (route segments) 10 of the mission route to certain waypoints 30 of associated auxiliary routes, and also the "jumps" 11 to certain associated mission route waypoints for the return mode are shown in FIG. 4.

FIG. 5 schematically shows how the system comprises flight mode determination means 50 designed for determining, based on information 51 the system has (and including data such as the current location of the vehicle, wind speed, available fuel, state of the engines, etc., as well as preprogrammed conditions for flight mode changes), if the flight should continue in the mission mode or if it should abandon the mission mode, and for generating a mission mode abandonment event 52 if it determines that the mission mode should be abandoned. These flight mode determination means can be implemented as a software module, for example in the form of a computer program.

On the other hand, the system comprises route change means 53 (which can also be implemented in the form of a software module) associated to the flight mode determination means and designed for, as a response to a mission abandonment event 52, determining (54) which part of which auxiliary route is assigned to the mission route segment where the vehicle is located (by means of consulting 55 tables 400 and 450);

calculating (56) a transition route to said part of the auxiliary route (by means of route calculation software; there are commercial programs that can easily be applied for this purpose);

defining (57, 57a) the transition route as the active route, such that the flight control means provide control signals so that the vehicle follows said transition route to the corresponding part of the auxiliary route (this may consist of something as simple as determining waypoints corresponding to the auxiliary route, and substituting, in the part of the memory corresponding to the active route, the mission route waypoints with these transition route waypoints; alternatively, straight legs and spiral-like circular legs can be generated for the transition routes for carrying out these maneuvers without using waypoints);

once the transition route is completed, defining (58, 58a) the corresponding auxiliary route as the active route, such that the flight control means provide control signals so that the vehicle follows said auxiliary route (basically, the vehicle will be controlled as it was when it was flying following the mission route, except now the waypoints are the waypoints of an auxiliary route; however, this aspect is transparent for the part of control system which is responsible for controlling actuators based on the data stored in the memory 62, etc., therefore the new system can be easily implemented in any existing autonomous flight control device, i.e. without control of a human pilot or ground operator).

There can be a variety of causes of the event which brings about the need to divert from the nominal mission route, for example, engine failure, a fuel problem, etc. It may be appropriate to have different auxiliary routes for some or for all of the segments, such that choosing the auxiliary route is not done exclusively based on the mission route segment (current waypoint) in which the vehicle is located, but also according to what the cause was that brought about the need to divert from the mission route.

To that end, the flight mode determination means 50 are designed for generating mission mode abandonment events 52 such that they include an event type indicator selected from a plurality of event types according to the conditions that have brought about the abandonment of the mission mode (for example, the event may consist of sending a mission a bandonment command including a field indicating the event "type"); and the route change means 53 are designed for, as a response to a mission abandonment event, determining which part of the auxiliary route is a signed to the mission route segment where the vehicle is located according to the event type indicator.

This can be easily implemented, for example, by means of a plurality of tables such as table 400 described above (for example, one for each "event type"); the tables can be identical except in relation to the auxiliary route indicators (401) and indicators of part of the auxiliary route (402). The route change means 53 thus access table 400 corresponding to the "incident type" indicated in the mission mode abandonment event 52, and will therefore determine the auxiliary route and the part (waypoint) of the auxiliary route according to the event type. In this easy-to-implement manner (using a plurality of tables 400 and addressing the consultation 55 to one of said tables selected according to the event type indicator), it can be achieved that the vehicle chooses an auxiliary route in the case of engine failure, another auxiliary route in the case of a shortage (within pre-established limits) of fuel, etc.

Therefore, different courses can be available at all times which, although they will not assure completion of the mission, they will provide the recovery of the aircraft in a (rather) safe manner. This is achieved in the manner described above, establishing relationships (13) between each waypoint of the mission route with one or several of the auxiliary routes, as well as with the point of entry thereto (which can be a waypoint of the respective auxiliary route). These relationships may depend on the event type which forces non-completion of the nominal mission, a safe transition further being assured from the point of view of impact against the terrain and actions of the aircraft.

According to the precision of the guidance and control system, a "passage of uncertainty" will be known around the routes, within which the vehicle will be located at all times with a certain margin of safety.

Figure 6:
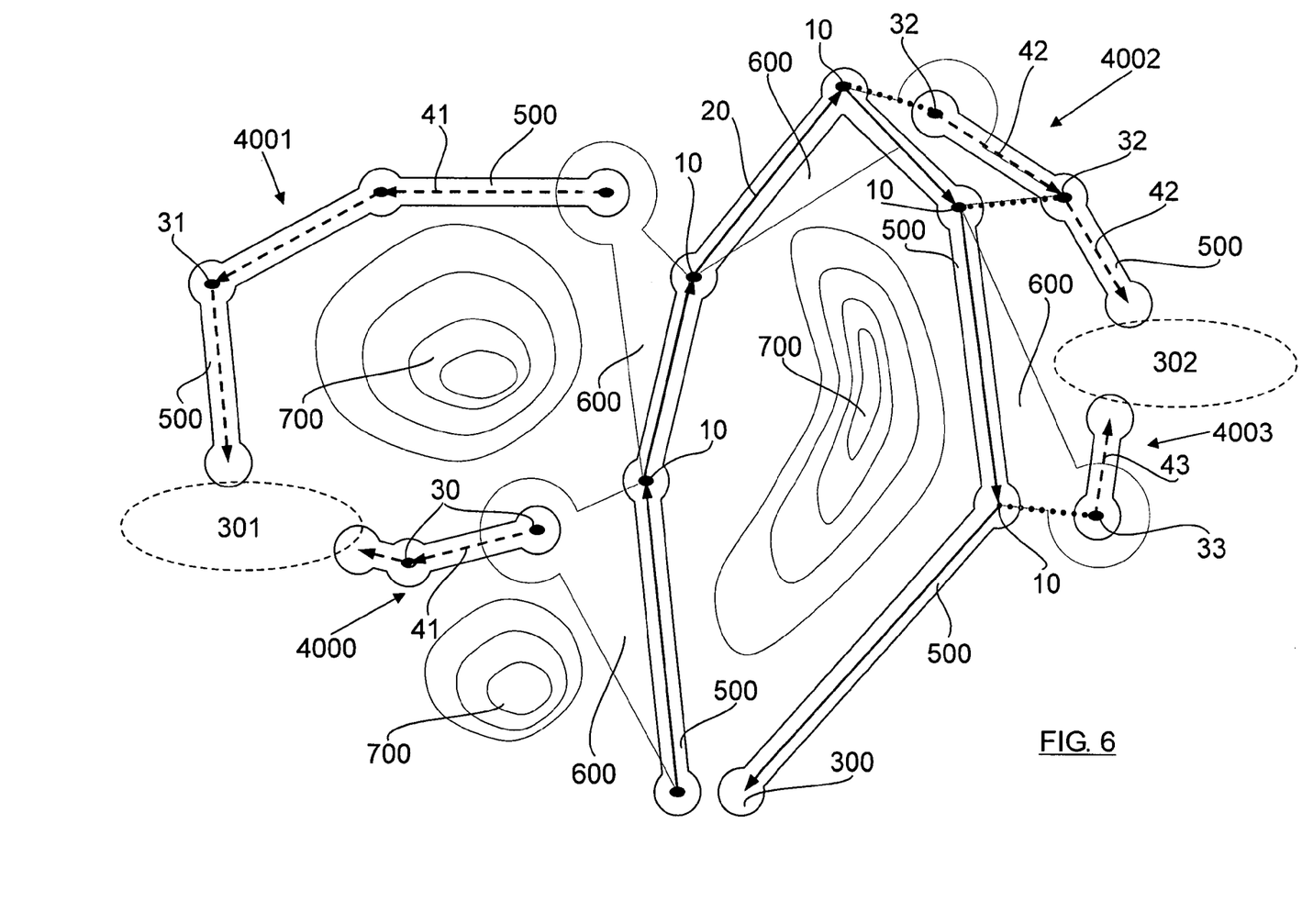
FIG. 6 shows a configuration of mission and auxiliary routes with their corresponding safety passages.

FIG. 6 schematically shows a configuration of a mission route defined by its waypoints 10 and legs 20, and a plurality of auxiliary routes 4000-4003 with their respective waypoints 30-33 defining the legs 40-44 of corresponding auxiliary routes. The corresponding safety passages 500 are established around the legs. Except in the case of a transition between routes (from the mission route to one of the auxiliary routes), it is known with a degree of certainty that the vehicle will be located in one of said "safety passages".

With regards to the location uncertainty that may occur in a transition, this can be maximally reduced, taking advantage of the fact that it is known at all times, according to the mission route segment in which the vehicle is located, which is the auxiliary route and the part of the auxiliary route that the aircraft will head to in the case of an incident (or, in the event that there are several auxiliary routes/parts of the auxiliary route for a defined mission route segment, which are said parts of the auxiliary route). Therefore, and according to the configuration of the transition route calculation sub-system (56), for each mission route segment having one or several auxiliary routes (and parts of the auxiliary routes) associated thereto, possible "transition areas" can be calculated within which any transition operation will have to be carried out.

Thus, by suitably establishing the mission route, the auxiliary routes (and the relationship between them and the mission route) as well as the mechanisms and conditions for calculating the transition routes, it can be achieved that neither the "safety passages" 500 nor the "transition areas" 600 interfere with certain elements, for example with mountains 700, buildings or airways reserved for civil aviation, etc.

The system thus allows control of the unmanned vehicle in a rather sure manner, with a "guarantee" of not interfering with certain objects, without the vehicle itself having to carry on board the information and the equipment needed for calculating the auxiliary routes, etc. All calculation of auxiliary routes, of allowed transition areas 600 and of the safety passages 500, etc., can be carried out on the ground in a route configuration design phase; the vehicle only has to carry on board the information regarding the mission route and the auxiliary routes, tables relating the mission route segments with the corresponding parts of the auxiliary routes, and a sub-system capable of calculating the respective transition routes. Therefore, the system can be easily carried out and can be implemented in existing unmanned air vehicle control systems.

Therefore, provided that the aircraft is following one of the pre-programmed routes, based on a correct planning thereof, it will be assured that it is followed safely and without finding obstacles with the terrain as it is within this safety passage. In the event that the relative uncertainty involves the transition areas 600, the system may generate the transitions in a sure manner which prevents maneuvers outside of the capacities of the aircraft and obstacles with the terrain. If the course of entry to the new route requires an angle of climb exceeding the angle that the aircraft can carry out, it will climb following an upwards circular course until reaching an optimal height for then heading towards the point of entry to this route. If in contrast it requires a high angle of descent, it will head for the point of entry to the new route to then descend following a downward circular course. In fact, the route change means can be designed for calculating a transition route such that:

if the movement to the part of the auxiliary route involves a climb to a height exceeding the current height of the vehicle and a movement in the horizontal direction, the transition route is calculated such that it starts with a climb substantially up to said greater height, followed by the movement in the horizontal direction; and if the movement to the part of the auxiliary route involves a descent to a height less than the current height of the vehicle and a movement in the horizontal direction, the transition route is calculated such that it starts with the movement in the horizontal direction, followed by a descent to said lower height.

The extent of the "transition area" is thus reduced at low altitudes, such that it is easier to design systems which allow avoiding interference with objects such as mountains 700, etc.

From a system point of view, the invention can be implemented in a modular manner, such that it consists of the following modules:

A. Incident management module. This module is responsible for managing the possible incidents which may require diverting from the desired route and for reporting this to the mission supervision module.

B. Mission data management module. This module is responsible for managing the information contained in the mission data, providing the mission supervision system with the different waypoints completing the mission and the auxiliary route waypoints associated to each of them. It consists of:
Nominal route management module.
Auxiliary route management module.

C. Transition management module. This module is responsible for handling the mission from the moment in which it diverts from the nominal route until it enters the corresponding auxiliary route, assuring that it is done safely. It consists of:
Vertical acquisition module.
Horizontal acquisition module.

D. Reference generation module. This module is responsible for providing the vehicle guidance and control system the reference courses and speed from the waypoints or from the transition references. It consists of:
Waypoint handler.
Horizontal course generator.
Vertical course generator.
Three-dimensional reference handler.

E. Mission supervision module. This module is responsible for controlling and managing the remaining modules of the mission management system.

Throughout the present description and claims, the word "comprises" and variations thereof such as "comprising" do not aim to exclude other steps or components.

The invention claimed is:
1. An unmanned air vehicle control system, comprising:
flight control means designed for providing control signals to control components of the vehicle such that the vehicle follows an active route according to data indicating said active route stored in the control system;
means for storing data indicating a mission route comprising a plurality of mission route segments;
the system being designed such that in one mission mode, the mission route is the active route, such that the control means provide the control signals calculated from the data indicating the mission route, so that the vehicle follows the mission route;
further comprising
means for storing data indicating at least one auxiliary route different from the mission route, such that each of a plurality of the mission route segments is assigned at least part of at least one auxiliary route;
flight mode determination means designed for determining if the flight should continue in the mission mode or if it should abandon the mission mode, and for generating a mission mode abandonment event if they determine that the mission mode should be abandoned;
route change means associated to the flight mode determination means and designed for, as a response to a mission abandonment event,
determining which part of which auxiliary route is assigned to the mission route segment where the vehicle is located;
calculating a transition route to said part of the auxiliary route;
defining the transition route as the active route, such that the flight control means provide control signals so that the vehicle follows said transition route to the corresponding part of the auxiliary route;
once the transition route is completed, defining the corresponding auxiliary route as the active route, such that the flight control means provide control signals so that the vehicle follows said auxiliary route, and
wherein said means for storing data indicating a mission route and the means for storing data indicating at least one auxiliary route, are designed as:
a list of the mission route segments;
for each auxiliary route, a list of the parts of the auxiliary route;
associated to the list of the mission route segments, for each of a plurality of the segments of said list,
at least one indicator of the auxiliary route specifying, for said segment, an auxiliary route, and
at least one indicator of part of the auxiliary route specifying, for said segment, the part of said auxiliary route associated to the segment.

2. The system according to claim 1, wherein each auxiliary route is determined by a plurality of auxiliary route waypoints, and each part of the auxiliary route corresponds to one of said auxiliary route waypoints.

3. The system according to claim 1, wherein said mission route is determined by a plurality of mission route waypoints, and each mission route segment corresponds to one of said mission route waypoints.

4. The system according to claim 1, further comprising means for storing data indicating a plurality of auxiliary routes, such that each of a plurality of the mission route segments is assigned at least part of one of said auxiliary routes.

5. The system according to claim 1,
said flight mode determination means are designed for generating the mission mode abandonment events such that they include an event type indicator selected from a plurality of event types according to conditions which have caused the abandonment of the mission mode;

said route change means are designed for, as a response to a mission abandonment event, determining which part of the auxiliary route is assigned to the mission route segment where the vehicle is located, according to the event type indicator.

6. The system according to claim 1, wherein at least one of the auxiliary route indicators and at least one of the indicators of part of the auxiliary route are designed for indicating the auxiliary route and the part of said auxiliary route, according to the event type indicator.

7. An unmanned air vehicle control system, comprising:
flight control means designed for providing control signals to control components of the vehicle such that the vehicle follows an active route according to data indicating said active route stored in the control system;
means for storing data indicating a mission route comprising a plurality of mission route segments;
the system being designed such that in one mission mode, the mission route is the active route, such that the control means provide the control signals calculated from the data indicating the mission route, so that the vehicle follows the mission route;
further comprising
means for storing data indicating at least one auxiliary route different from the mission route, such that each of a plurality of the mission route segments is assigned at least part of at least one auxiliary route;
flight mode determination means designed for determining if the flight should continue in the mission mode or if it should abandon the mission mode, and for generating a mission mode abandonment event if they determine that the mission mode should be abandoned;
route change means associated to the flight mode determination means and designed for, as a response to a mission abandonment event,
  determining which part of which auxiliary route is assigned to the mission route segment where the vehicle is located;
  calculating a transition route to said part of the auxiliary route;
  defining the transition route as the active route, such that the flight control means provide control signals so that the vehicle follows said transition route to the corresponding part of the auxiliary route;
  once the transition route is completed, defining the corresponding auxiliary route as the active route, such that the flight control means provide control signals so that the vehicle follows said auxiliary route; and
wherein said route change means are designed for calculating a transition route such that:
if the movement to the part of the auxiliary route involves a climb to a height exceeding the current height of the vehicle and a movement in the horizontal direction, the transition route is calculated such that it starts with a climb substantially up to said greater height, followed by the movement in the horizontal direction; and
if the movement to the part of the auxiliary route involves a descent to a height less than the current height of the vehicle and a movement in the horizontal direction, the transition route is calculated such that it starts with the movement in the horizontal direction, followed by a descent to said lower height.

8. The system according to claim 7, wherein to each of the plurality mission route segment there is associated another mission route segment corresponding to a return mode, the system being designed such that as a response to a return command, the vehicle heads for said associated mission route segment, corresponding to the return mode, to then follow the mission route in a return direction.

9. An unmanned air vehicle control method, comprising the steps of:
providing control signals via a processor to control components of the vehicle such that the vehicle follows an active route according to data indicating said active route stored in a control system of the vehicle;
in one mission mode, defining the mission route as the active route, such that the control means provide the control signals calculated from data indicating the mission route, so that the vehicle follows the mission route, the mission route comprising a plurality of mission route segments;
further comprising the steps of
having data indicating at least one auxiliary route different from the mission route, such that each of a plurality of the mission route segments, is assigned at least part of at least one auxiliary route;
determining if the flight should continue in the mission mode or if it should abandon the mission mode, and generating a mission mode abandonment event if it is determined that the mission mode should be abandoned;
as a response to a mission abandonment event,
  determining which part of which auxiliary route is assigned to the mission route segment where the vehicle is located;
  calculating a transition route to said part of the auxiliary route;
  providing control signals so that the vehicle follows said transition route to the corresponding part of the auxiliary route;
  once the transition route is completed, providing control signals so that the vehicle follows said auxiliary route; and
wherein the data indicating a mission route and the data indicating at least one auxiliary route are stored in a configuration comprising:
a list of the mission route segments;
for each auxiliary route, a list of the parts of the auxiliary route;
associated to the list of the mission route segments, for each of a plurality of the segments of said list,
  at least one indicator of the auxiliary route specifying, for said segment, an auxiliary route, and
  at least one indicator of part of the auxiliary route specifying, for said segment, the part of said auxiliary route associated to the segment.

10. The method according to claim 9, wherein each auxiliary route is determined by a plurality of waypoints of the auxiliary route, and each part of the auxiliary route corresponds to one of said auxiliary route waypoints.

11. The method according to claim 9, the mission route is determined by a plurality of mission route waypoints, and each mission route segment corresponds to one of said mission route waypoints.

12. The method according to claim 9, wherein data indicating a plurality of auxiliary routes are stored, such that each of a plurality of the mission route segments, is assigned, at least, part of one of said auxiliary routes.

13. The method according of claim 9, wherein the mission mode abandonment events are generated such that they include an event type indicator selected from a plurality of event types according to conditions which have caused the abandonment of the mission mode and it is determined which part of the auxiliary route is assigned to the segment of the mission route where the vehicle is located, according to the event type indicator.

14. The method according to claim 9, wherein at least one of the auxiliary route indicators and at least one of the indicators of part of the auxiliary route indicate the auxiliary route and the part of said auxiliary route, respectively, according to the event type indicator.

15. An unmanned air vehicle control method, comprising the steps of:
   providing control signals via a processor to control components of the vehicle such that the vehicle follows an active route according to data indicating said active route stored in a control system of the vehicle;
   in one mission mode, defining the mission route as the active route, such that the control means provide the control signals calculated from data indicating the mission route, so that the vehicle follows the mission route, the mission route comprising a plurality of mission route segments;
   further comprising the steps of
   having data indicating at least one auxiliary route different from the mission route, such that each of a plurality of the mission route segments, is assigned at least part of at least one auxiliary route;
   determining if the flight should continue in the mission mode or if it should abandon the mission mode, and generating a mission mode abandonment event if it is determined that the mission mode should be abandoned;
   as a response to a mission abandonment event,
      determining which part of which auxiliary route is assigned to the mission route segment where the vehicle is located;
      calculating a transition route to said part of the auxiliary route;
      providing control signals so that the vehicle follows said transition route to the corresponding part of the auxiliary route;
      once the transition route is completed, providing control signals so that the vehicle follows said auxiliary route; and
   wherein transition route is calculated such that:
      if the movement to the part of the auxiliary route involves a climb to a height exceeding the current height of the vehicle and a movement in the horizontal direction, the transition route is calculated such that it starts with a climb substantially up to said greater height, followed by the movement in the horizontal direction; and
      if the movement to the part of the auxiliary route involves a descent to a height less than the current height of the vehicle and a movement in the horizontal direction, the transition route is calculated such that it starts with the movement in the horizontal direction, followed by a descent to said lower height.

16. The method according to claim 15, wherein to each mission route segment there is associated another mission route segment corresponding to a return mode, and in that as a response to a return command, the vehicle heads for said associated mission route segment, corresponding to the return mode, to then follow the mission route in a return direction.

17. The system according to claim 1, wherein to each of the plurality of mission route segments there is associated another mission route segment corresponding to a return mode, the system being designed such that as a response to a return command, the vehicle heads for said associated mission route segment, corresponding to the return mode, to then follow the mission route in a return direction.

* * * * *